(12) United States Patent
Zeng

(10) Patent No.: US 11,260,300 B2
(45) Date of Patent: Mar. 1, 2022

(54) IMAGE PROCESSING METHOD AND APPARATUS

(71) Applicant: TENCENT TECHNOLOGY (SHENZHEN) COMPANY LIMITED, Guangdong (CN)

(72) Inventor: Yuan Zeng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/116,187

(22) Filed: Dec. 9, 2020

(65) Prior Publication Data

US 2021/0086076 A1 Mar. 25, 2021

Related U.S. Application Data

(63) Continuation of application No. 16/354,534, filed on Mar. 15, 2019, now Pat. No. 10,888,782, which is a
(Continued)

(30) Foreign Application Priority Data

Dec. 6, 2016 (CN) .......................... 201611108969.6
Dec. 6, 2016 (CN) .......................... 201611108978.5

(51) Int. Cl.
*A63F 13/537* (2014.01)
*G06T 11/60* (2006.01)
(Continued)

(52) U.S. Cl.
CPC ............ *A63F 13/537* (2014.09); *A63F 13/52* (2014.09); *G06T 11/60* (2013.01); *G06T 15/00* (2013.01); *G06T 15/503* (2013.01)

(58) Field of Classification Search
CPC ................................. A63F 13/52; G06T 11/60
See application file for complete search history.

(56) References Cited

U.S. PATENT DOCUMENTS

| 9,046,684 B1 | 6/2015 | Feinstein et al. |
| 2006/0046844 A1* | 3/2006 | Kaneko ................... A63F 13/10 463/32 |

(Continued)

FOREIGN PATENT DOCUMENTS

| CN | 101923602 A | 12/2010 |
| CN | 104063240 A | 9/2014 |

(Continued)

OTHER PUBLICATIONS

International Search Report for PCT/CN2017/114609 dated Mar. 6, 2018 [PCT/ISA/210].

(Continued)

*Primary Examiner* — Shivang I Patel
(74) *Attorney, Agent, or Firm* — Sughrue Mion, PLLC

(57) ABSTRACT

An image processing method is provided. Information about a current location of a virtual object on an application interface is obtained, and line-of-sight blocking data corresponding to the location information is queried for. A first mask layer is generated based on a current operation status of the virtual object on the application interface by using the line-of-sight blocking data. A second mask layer is replaced with the first mask layer according to a preset unit of time, the second mask layer being one of at least two mask layers that are generated prior to generation of the first mask layer, the second mask layer being generated earliest among the at least two mask layers. A result of mixing the first mask layer and the at least two mask layers, except the second mask layer, to the application interface is output.

20 Claims, 10 Drawing Sheets

Related U.S. Application Data continuation of application No. PCT/CN2017/114609, filed on Dec. 5, 2017.

(51) Int. Cl.
*A63F 13/52* (2014.01)
*G06T 15/00* (2011.01)
*G06T 15/50* (2011.01)

(56) References Cited

U.S. PATENT DOCUMENTS

2018/0253891 A1* 9/2018 Dohta .................... A63F 13/42
2019/0366212 A1* 12/2019 Kusakihara ......... G06F 3/04815

FOREIGN PATENT DOCUMENTS

| | | |
|---|---|---|
| CN | 104679509 A | 6/2015 |
| CN | 105126343 A | 12/2015 |
| CN | 106730840 A | 5/2017 |
| CN | 106780696 A | 5/2017 |

OTHER PUBLICATIONS

"Unity3D+moba+小地图视野" https://blog.csdn.net/luoyikun/article/details/51319618, published on May 5, 2016 (total 7 pages).
Written Opinion of the International Searching Authority for PCT/CN2017/114609 dated Mar. 6, 2018.
Chinese Office Action issued in application No. 2016111089696 dated Mar. 28, 2018.
Chinese Office Action issued in application No. 201611108969.6 dated Jul. 2, 2018.

* cited by examiner

IMAGE PROCESSING METHOD AND APPARATUS

CROSS-REFERENCE TO RELATED APPLICATION(S)

This application is a continuation of U.S. application Ser. No. 16/354,534, filed Mar. 15, 2019, which is a continuation of International Application No. PCT/CN2017/114609, filed on Dec. 5, 2017, which claims priorities to Chinese Patent Application No. 201611108978.5 filed with the Chinese Patent Office on Dec. 6, 2016 and entitled "IMAGE DISPLAY METHOD AND MOBILE TERMINAL", and to Chinese Patent Application No. 201611108969.6 filed with the Chinese Patent Office on Dec. 6, 2016 and entitled "IMAGE PROCESSING METHOD AND APPARATUS", the disclosures of which are incorporated herein by reference in their entireties.

BACKGROUND

1. Field

Exemplary embodiments of the disclosure relates to the field of Internet technologies, and in particular, to an image processing method and apparatus.

2. Description of the Related Art

Among current interactive applications, a plurality of virtual objects interact with each other on an application interface of the interactive applications. Each virtual object has a limited visible range when at a specific location on the application interface, and areas beyond the visible range are all subject to line-of-sight blocking using a mask layer. A mask layer effect is implemented by uploading a mask map calculated for each frame to a graphics card, and then completing a rendering effect and a smoothing effect by using a pixel post-processing program.

During interaction, the visible range of each virtual object on the application interface may change. Therefore, every time a location of a virtual object changes, a terminal device needs to calculate a visible range of the virtual object at a current location, and calculate a current visible range of a virtual object of an enemy, to find a virtual object of an enemy entering the visible range of the virtual object or avoid a situation in which the virtual object is found by a virtual object of an enemy. Correspondingly, a terminal device manipulating the virtual object of the enemy also needs to calculate, in real time, a current visible range of the virtual object of the enemy.

To ensure a spatially smooth effect of rendering, that is, ensure natural demarcation edge transition, rendering on the mask layer generally includes blurring processing based on pixel expansion. To perform blurring processing on a demarcation edge of the mask layer, a smoothing effect of the demarcation edge of the mask layer is implemented through pattern branching. However, in these two processing manners, when calculating visible ranges of virtual objects and updating a mask map in real time, a terminal device needs to perform massive and high-frequency operations, leading to a high performance loss of the terminal device.

SUMMARY

One or more exemplary embodiments provide an image processing method and apparatus, which can solve a problem in the related art technology that a terminal device suffers from a high performance loss during a real-time update of a mask map.

According to an aspect of an exemplary embodiment, an image processing method is provided. Information about a current location of a virtual object on an application interface is obtained, and line-of-sight blocking data corresponding to the location information is queried for. A first mask layer is generated based on a current operation status of the virtual object on the application interface by using the line-of-sight blocking data. A second mask layer is replaced with the first mask layer according to a preset unit of time, the second mask layer being one of at least two mask layers that are generated prior to generation of the first mask layer, the second mask layer being generated earliest among the at least two mask layers. A result of mixing the first mask layer and the at least two mask layers, except the second mask layer, to the application interface is output.

According to an aspect of another exemplary embodiment, an image processing apparatus including a memory and a processor is provided. The memory is configured to store program code. The processor is configured to execute the program code stored in the memory, to perform: obtaining information about a current location of a virtual object on an application interface, and querying for line-of-sight blocking data corresponding to the location information; generating a first mask layer based on a current operation status of the virtual object on the application interface by using the line-of-sight blocking data; replacing a second mask layer with the first mask layer according to a preset unit of time, the second mask layer being one of at least two mask layers that are generated prior to generation of the first mask layer, the second mask layer being generated earliest among the at least two mask layers; and outputting a result of mixing the first mask layer and the at least two mask layers, except the second mask layer, to the application interface.

According to an aspect of another exemplary embodiment, a non-transitory computer readable storage medium, including instructions, is provided. The instructions cause, when executed by a computer, the computer to perform: obtaining information about a current location of a virtual object on an application interface, and querying for line-of-sight blocking data corresponding to the location information; generating a first mask layer based on a current operation status of the virtual object on the application interface by using the line-of-sight blocking data; replacing a second mask layer with the first mask layer according to a preset unit of time, the second mask layer being one of at least two mask layers that are generated prior to generation of the first mask layer, the second mask layer being generated earliest among the at least two mask layers; and outputting a result of mixing the first mask layer and the at least two mask layers, except the second mask layer, to the application interface.

As compared with the related art technology, in the solutions provided in the present disclosure, corresponding line-of-sight blocking data can be directly obtained through query based on current location information of a virtual object, which can reduce processing operations. Then a first mask layer is generated by using the line-of-sight blocking data, and uploaded to a display unit within a unit of time, to replace an earliest mask layer in the display unit. A weight of a grayscale value of a mask layer on an application interface is updated by mixing and outputting remaining mask layers in the display unit. In this way, smooth transition of a mask map is achieved on a per frame basis, and operation load caused by high-frequency mask map uploading can be reduced.

BRIEF DESCRIPTION OF THE DRAWINGS

The above and/or other aspects will become apparent and more readily appreciated by describing certain exemplary embodiments with reference to the accompanying drawings, in which.

DETAILED DESCRIPTION

Figure 1:
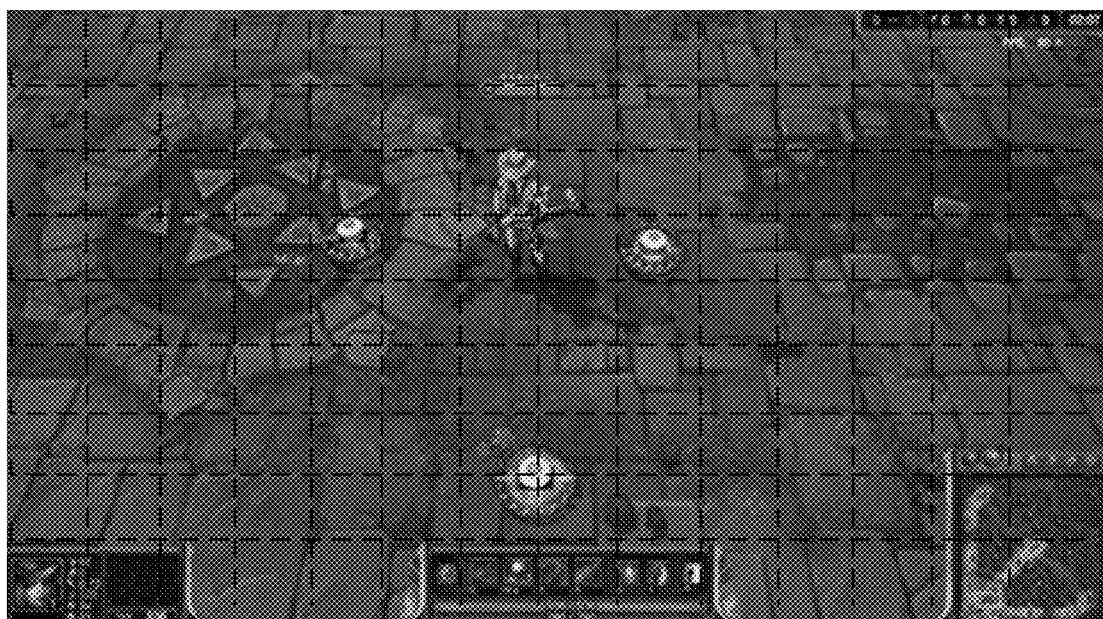
FIG. 1 is a schematic layout diagram of an application interface according to an embodiment.

Embodiments of the disclosure provide an image processing method and apparatus, applied to the field of Internet communications technologies, which can achieve smooth transition of a mask map on a per frame basis, and reduce operation load caused by high-frequency mask map uploading and operation load caused by real-time visible range calculation.

The technical solutions in the embodiments are clearly and completely described in the following with reference to the accompanying drawings. Apparently, the described embodiments are merely exemplary rather than all of the embodiments of the disclosure.

In the specification, claims, and accompanying drawings, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those units, but may include other operations or units not expressly listed or inherent to such a process, method, system, product, or device.

With the rapid development of the Internet, online competitive games become more popular. Currently, multiplayer online battle arena (MOAB) games are a type of popular online competitive games.

In MOBA, players are generally divided into two parties against each other. Herein, a party that a player fights for is referred to as an ally, and a party that the player fights against is referred to as an enemy. MOBA provides the player with a virtual object. The virtual object is displayed as a character to the player. The player manipulates a character chosen by the player to fight against the enemy.

MOBA also provides the player with non-player characters (NPCs) such as soldiers. The player may use own NPCs such as soldiers to help the player fight.

A visual effect of "fog" is a common mechanism used in MOBA games. The fog mechanism effectively improves tactics and playability of games. On a map of a game, an area that has not been explored by an own virtual object of a player, that is, an area that has not been explored by characters of the player and an ally partner of the player in the game (in some MOBA games, a player's own NPC such as a solider may also act as an own virtual object of the player) is indicated as being blocked by fog by default, for which a mobile terminal displays a dark fog effect on a screen, so that the area is invisible to the player. When the own virtual object of the player explores the area, it is considered that fog within a field-of-view range of the virtual object is dispersed, and the mobile terminal removes fog blocking within the field-of-view range of the virtual object, and displays landforms within the field-of-view range of the virtual object. The field-of-view range of the virtual object is an area to which a line of sight of the virtual object extends.

To improve playability of the game, a plurality of obstacle objects may be further arranged on the map of the game. These obstacle objects are specifically displayed on the map as obstacles such as bush and walls to the player. The obstacles can block the line of sight of the virtual object, so that the line of sight of the virtual object extends only to the obstacles, and cannot cover an area behind the obstacles. In this case, during fog dispersal, the field-of-view range of the virtual object is reduced by the obstacles, and fog in the area behind the obstacles cannot be dispersed.

It should be understood that an image processing method in the disclosure may be independently completed by a terminal device, or may be jointly completed by a server and a terminal device. An interactive application (or referred to as a client) is installed on the terminal device in the disclosure. The interactive application may be specifically a MOBA game. The interactive application includes an application interface. A virtual object is a virtual character running in the interactive application, for example, a player-controlled character in the MOBA game.

The application interface is divided into a plurality of area units. For example, the application interface may be divided as m*n pixel grids, where m and n are both positive integers, and m and n may be equal or unequal. Each area unit has a corresponding visible range on the application interface. Each object on the application interface occupies a specific area unit. The area unit can indicate information about a location of each object on the application interface.

FIG. 1 is a layout diagram on the application interface, where an area bounded by a dashed-line block represents an area unit.

The visible range is comprehensively calculated based on a current location of an area unit on the application interface in combination with an obstacle, a layout, and the like around the area unit through line-of-sight detection based on a field-of-view range of the area unit, and is an area unit visible at the location of the area unit. The visible range may be demarcated by a rendering effect of blocking formed by a mask layer. Specifically, the visible range may be reflected by line-of-sight blocking data.

The mask layer is an image generated based on line-of-sight blocking data of a specific location on the application interface. An image in a graphic linked to the mask layer is masked. A plurality of layers may be combined under one mask layer, to create a manifold effect. The mask layer is converted from line-of-sight blocking data of an area unit on the application interface. After the obtained mask layer is uploaded to a display unit, pixels at a demarcation edge of the mask layer are processed, so that a spatially smooth fog effect is formed at the demarcation edge. In an actual game scene, an effect of the mask layer is reflected by war fog. The war fog is a mechanism of tactics unpredictability to both parties in a war game. The war fog generally includes two layers. The first layer is topographic black fog (e.g., geographical landforms are invisible and black); the second layer is field-of-view fog (e.g., a field of view in an area is missing in the absence of an own unit).

A part or all of line-of-sight blocking data corresponding to each location on the application interface may be pre-calculated outside the application interface. By means of pre-calculation, after the player logs in to the interactive application, pre-calculated line-of-sight blocking data can be directly obtained through query based on current obtained location information of the virtual object manipulated by the player, which can greatly reduce operation load while improving fluency of the application interface. Because the application interface may include at least one of a static obstacle and a dynamic obstacle, during pre-calculation, line-of-sight blocking data corresponding to each area unit on the application interface may be calculated based on at least one of the static obstacle and the dynamic obstacle in the application interface, and then the pre-calculated line-of-sight blocking data is stored locally.

Pre-calculation refers to a basic assumption that input data is known before an algorithm is executed. All input data of a problem needs to be known at first, and a result must be output immediately to solve the problem. Such an algorithm designed under the premise that all information of a problem is known may be referred to as an offline algorithm.

The server and the terminal device both can complete a pre-calculation function, and both can calculate line-of-sight blocking data in real time for a dynamic obstacle present in the application interface. The terminal device may also cooperate with the server to complete pre-calculation or real-time calculation for a dynamic obstacle. If real-time calculation for a dynamic obstacle is performed by the server, the server may send line-of-sight blocking data obtained after real-time calculation to the terminal device. In the disclosure, each virtual object may log in to the application interface of the interactive application, and interact with another virtual object on the application interface.

The terminal device in the disclosure may be any terminal device such as a mobile phone, a tablet computer, a personal digital assistant (PDA), a point of sales (POS), or an in-vehicle computer.

The following technical solutions are provided by embodiments of the disclosure:

Line-of-sight blocking data of each area unit on an application interface is pre-calculated, and the area unit and the corresponding line-of-sight blocking data are stored locally. After a player chooses a virtual object and enters the application interface, when the player manipulates the virtual object in real time, current location information of the virtual object may be detected, and based on an area unit corresponding to the location information, line-of-sight blocking data corresponding to the area unit is queried for. Next, the line-of-sight blocking data obtained through query can be converted into a mask layer in real time. In this way, real-time calculation operations on line-of-sight blocking data required for generating a mask layer when the player operates the application interface in real time can be reduced by means of pre-calculation, which greatly reduces operation time, and certainly can reduce operation load and lower a hardware requirement on a terminal device.

In addition, to achieve a smoothing effect for the mask layer output to the application interface, a mask layer is uploaded according to an interval of a preset length of time to replace an earlier mask layer in a display unit, and a fog mask effect is updated in real time by an interpolation between at least two consecutive mask layers uploaded during image rendering of each frame. Such operations are repeated according to the interval of a preset length of time. In this way, a smooth transition effect can be achieved for a fog mask on a per frame basis, and it can be avoided that mask layers generated in real time are frequently uploaded to the display unit, and overload the display unit.

It should be noted that an apparatus for image processing in the disclosure may be arranged on an apparatus end (including a terminal device or a server), or in some scenarios, may be arranged in a terminal device as a client having an image processing function. In the following embodiments, for illustrative purposes, a description will be made with respect to the apparatus for image processing that is arranged on a terminal device end as a service end. If the apparatus for image processing is a client that is arranged in a terminal device, during image processing, image processing operations in the embodiments may be all completed by the client. A type of a device in which the apparatus is specifically arranged is not limited in the disclosure.

Figure 2:
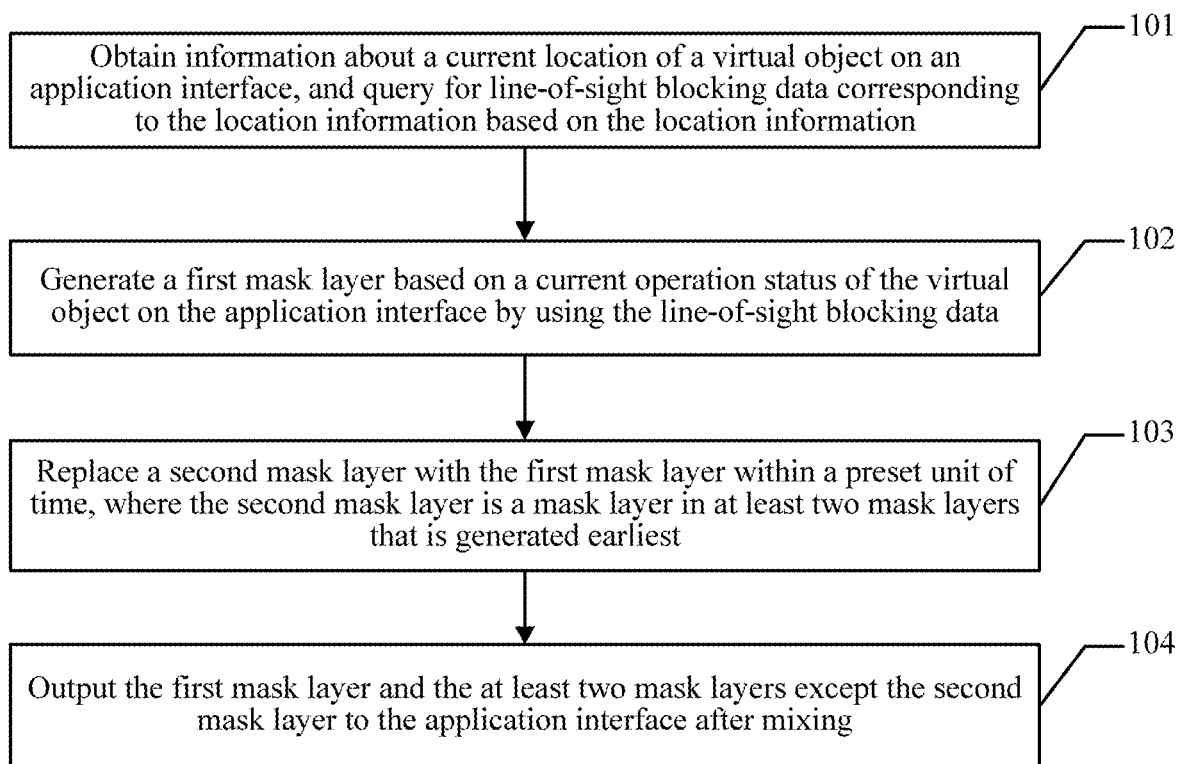
FIG. 2 is a schematic flowchart of an image processing method according to an embodiment.

FIG. 2 is a schematic flowchart of an image processing method according to an embodiment.

Referring to FIG. 2, the following illustrates an image processing method provided in the disclosure. An embodiment includes the following operations 101-104:

Operation 101. Obtain information about a current location of a virtual object on an application interface, and query for line-of-sight blocking data corresponding to the location information based on the location information.

Because the application interface may include at least one of a static obstacle and a dynamic obstacle, during pre-calculation, line-of-sight blocking data corresponding to each area unit on the application interface may be calculated based on at least one of the static obstacle and the dynamic obstacle in the application interface, and the line-of-sight blocking data corresponding to each area unit on the application interface is stored locally.

If calculation is performed based on the dynamic obstacle in the application interface, each location at which the dynamic obstacle may appear needs to be predicted, then corresponding line-of-sight blocking data is calculated for each location, and the obtained line-of-sight blocking data is stored locally. During pre-calculation, line-of-sight blocking data corresponding to some or all dynamic locations of a same dynamic obstacle in the application interface may be calculated, which is specifically determined depending on an actual application design requirement, and is not limited in the disclosure. The following describes pre-calculation and real-time calculation of line-of-sight blocking data:

1. Pre-Calculation

First, second location information of an obstacle is obtained, where the obstacle may include at least one of the static obstacle and the dynamic obstacle.

Then, a visible range of each area unit is calculated through line-of-sight detection based on a field-of-view range of the second location information, where the visible range of the area unit is used for the virtual object to determine a current visible range of the virtual object based on the current location information of the virtual object, and determine a current visible range of another virtual object based on current location information of the another virtual object.

It can be learned that a visible range based on the static obstacle can be calculated during pre-calculation, which can reduce operation load of a terminal device when running the application interface. Moreover, because the static obstacle is fixed in location and number, pre-calculation is simple, and a pre-calculation result occupies small storage space.

Alternatively, only a visible range based on the dynamic obstacle is calculated. The dynamic obstacle is not fixed in number, or a location of the dynamic obstacle in the application interface dynamically changes. When the location of the dynamic obstacle changes, correctness of a local stored visible range of an area unit around a current location of the dynamic obstacle is affected. Therefore, a track of the dynamic obstacle may be pre-obtained, and a visible range is pre-calculated based on at least one point in the track. Then when a player manipulates the virtual object in real time, unstored line-of-sight blocking data in the presence of the dynamic obstacle does not need to be calculated in real time. As can be seen, the operation load of the terminal device when running the application interface can be reduced.

2. Real-Time Calculation

In consideration of a track change of the dynamic obstacle, if pre-calculation is performed based on each point in the track of the dynamic obstacle, a visible range of a corresponding area unit when the dynamic obstacle moves to each point needs to be considered. In this case, calculation is complex, and more storage space needs to be occupied. Therefore, the disclosure further provides a mechanism to optimize the pre-calculation function, which is specifically as follows:

If the line-of-sight blocking data corresponding to each area unit on the application interface is calculated based on the static obstacle in the application interface, when a target dynamic obstacle is present in the application interface within a visible range corresponding to the location information, and line-of-sight blocking data of information about a first location of the target dynamic obstacle on the application interface in the presence of the target dynamic obstacle is not stored locally, operations according to an exemplary embodiment further includes:

calculating a current visible range of the first location information through line-of-sight detection based on a field-of-view range of the first location information; and storing the current visible range of the first location information, to replace a local stored visible range of the first location information, where the current visible range of the first location information is used to determine a current visible range of the virtual object.

In this solution, pre-calculation may be performed only based on at least one point (for example, selected according to a specific rule) in the track of the dynamic obstacle, and then when the player manipulates the virtual object, and a visible range of an area unit is affected by the dynamic obstacle appearing in the visible range of the area unit, the visible range of the area unit may be re-calculated in real time based on a location of the dynamic obstacle. Certainly, if a location change of the dynamic obstacle causes little impact to the visible range of the area unit (for example, the dynamic obstacle appears near a boundary of the visible range of the area unit), the visible range of the area unit does not need to be re-calculated, and only a visible range of an area unit that is significantly affected is re-calculated, which can also reduce unnecessary calculation, and reduce the operation load.

Operation 102. Generate a first mask layer based on a current operation status of the virtual object on the application interface by using the line-of-sight blocking data.

Operation 103. Input, within a preset unit of time, the obtained first mask layer to a display unit including at least two mask layers, to replace a second mask layer in the at least two mask layers that is generated earliest.

The second mask layer is a mask layer generated earliest among previous output mask layers in the display unit. For example, a mask layer 3 and a mask layer 4 are previously input to the display unit, and the mask layer 3 is generated earlier than the mask layer 4. Then, after a mask layer 5 is uploaded, the mask layer 5 replaces the mask layer 3. In addition, at least two valid mask layers are selected. Specific selection is performed for mask layers mixed in operation 104, which may be determined by considering a factor such as, for example but not limited to, whether a delay occurs or whether a mask layer is not used. It should be noted that the replaced second mask layer may be directly deleted, or may be temporarily stored, but not output to the display unit at this time.

In an exemplary embodiment, a timer may be further set for mask layers. After timing of the timer is triggered and before timing ends, mask layers can be uploaded. A specific timing sequence for uploading mask layers is not specifically limited in the disclosure. Moreover, after the first mask layer replaces the second mask layer in the at least two mask layers that is generated earliest, the timer is reset for a next round of timing.

Operation 104. Output the first mask layer and the at least two mask layers except the second mask layer in the display unit to the application interface after mixing. Operation 104 may include mixing the first mask layer and the at least two mask layers except the second mask layer and output a result of mixing to the application interface.

Mixing remaining mask layers in the display unit may include:

calculating an interpolation between the first mask layer and the at least two mask layers except the second mask layer in the display unit, and updating a weight of a grayscale value of a mask layer on the application interface by using the interpolation.

For example, a mask layer 3 and a mask layer 4 are previously input to the display unit, and the mask layer 3 is generated earlier than the mask layer 4. Then, after a mask layer 5 is uploaded, the mask layer 5 replaces the mask layer 3. The display unit only needs to output the mask layer 4 and the mask layer 5 to the application interface after mixing.

Figure 3:
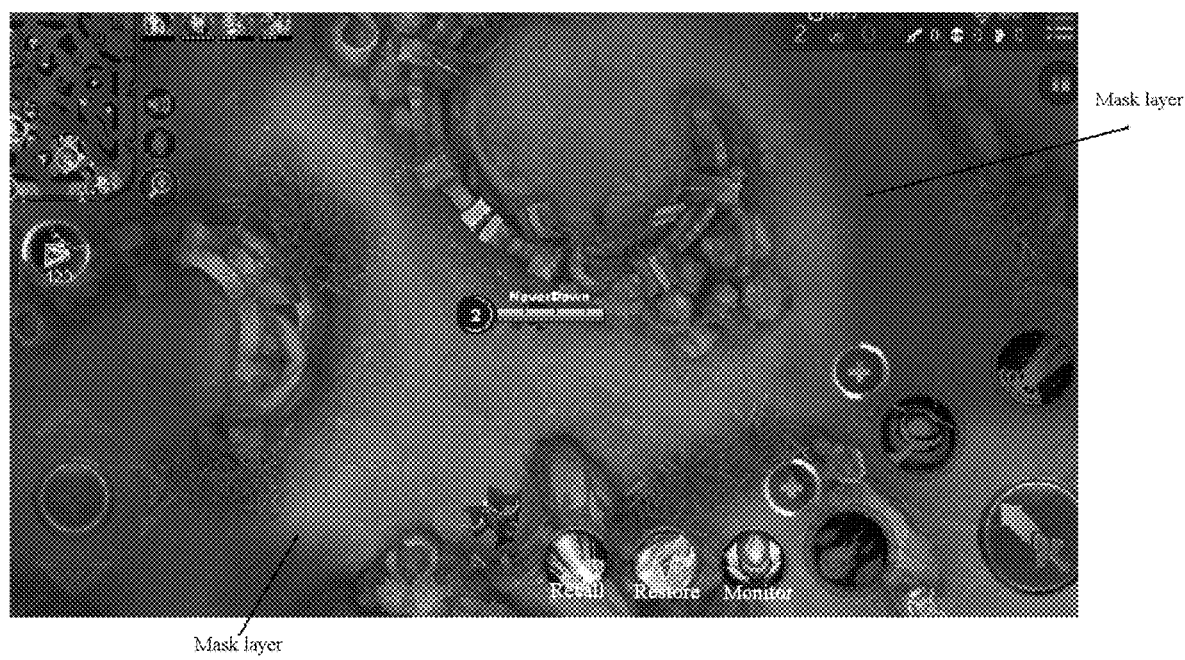
FIG. 3 is a schematic diagram of a fog effect of a mask map on an application interface according to an embodiment.

FIG. 3 is a schematic diagram of a current layout of a war interface of a game according to an exemplary embodiment. FIG. 3 shows a fog effect of mask maps output to the war interface in real time.

As compared with a related art mechanism, in this exemplary embodiment, when a player manipulates a virtual object, corresponding line-of-sight blocking data can be directly obtained through query based on current location information of the virtual object, which can reduce operation load. Then a first mask layer is generated by using the line-of-sight blocking data, and uploaded to a display unit within a unit of time, to replace an earliest mask layer in the display unit. A weight of a grayscale value of a mask layer on an application interface is updated by mixing and outputting remaining mask layers in the display unit. In this way, smooth transition of a mask map is achieved on a per frame basis, and operation load caused by high-frequency mask map uploading can be reduced.

In an exemplary embodiment, in some embodiments, when a demarcation edge of the mask layer is rendered, a grayscale value of each pixel on the demarcation edge may be calculated through pixel convolution.

The demarcation edge of the mask map includes a plurality of first pixels, and the calculating a grayscale value of each pixel on the demarcation edge through pixel convolution includes:

operation A: calculating, for a plurality of first pixels on a demarcation edge of a target mask map, a grayscale value of at least one pixel with a distance to each first pixel less than or equal to a; and operation B: obtaining a corresponding mask map based on the grayscale value of the at least one pixel obtained in operation A, and using the obtained mask map as the target mask map.

In this way, iterative calculation is performed by performing operation A and operation B a plurality of times, so that a pixel blurring effect at the demarcation edge can be achieved. Iterative calculation times may be set. For example, at least one target mask map that is finally obtained is used as an edge mask map of a mask layer when a number of times operation A and operation B are performed for each first pixel reaches a preset time.

Specifically, assuming that the preset iterative calculation times is two, the first round of processing is performed for five first pixels on the demarcation edge of the target mask map, and a grayscale value of at least one pixel with a distance to the five first pixels less than or equal to a (a being a preset value) is calculated. For example, grayscale values of 100 pixels with a distance to the $1^{st}$ first pixel less than or equal to a are obtained, and then grayscale values of 100 pixels with a distance to the $2^{nd}$ first pixel less than or equal to a are obtained, until grayscale values of 100 pixels with a distance to the $5^{th}$ first pixel less than or equal to a are obtained. Next, a new target mask map is generated based on the grayscale values of the 500 pixels corresponding to the five first pixels.

Then the second round of processing is performed. Similarly, the target mask map generated in the previous round is processed, and a processing manner is the same as that in the first round of processing. Finally, another new target mask layer is generated.

Such processing is performed by analogy, until the iterative calculation is performed a preset number times. Therefore, the at least one target mask map that is finally obtained is used as an edge mask map.

Compared with pattern branching in the related art mechanism, pixel convolution in this solution can avoid a problem of high performance overheads of the terminal device caused by pattern branching. Performance overheads of the terminal device required to obtain a same or similar fog mask smoothing effect are obviously reduced through pixel convolution.

In an exemplary embodiment, in some embodiments, the mixing the first mask layer and the at least two mask layers except the second mask layer in the display unit may correspond to mixing pixels of demarcation edges of the first mask layer and the at least two mask layers except the second mask layer in the display unit, where the demarcation edge is used to distinguish areas having a grayscale value difference on two sides of the demarcation edge.

In an exemplary embodiment, the image processing method according to an exemplary embodiment may further include a method of displaying an image. The following describes three image display manners.

1. Virtual-Object-Based Image Display Method.

In an exemplary embodiment, based on the embodiment corresponding to FIG. 2, a virtual-object-based image display method provided in an exemplary embodiment is described.

Figure 4:
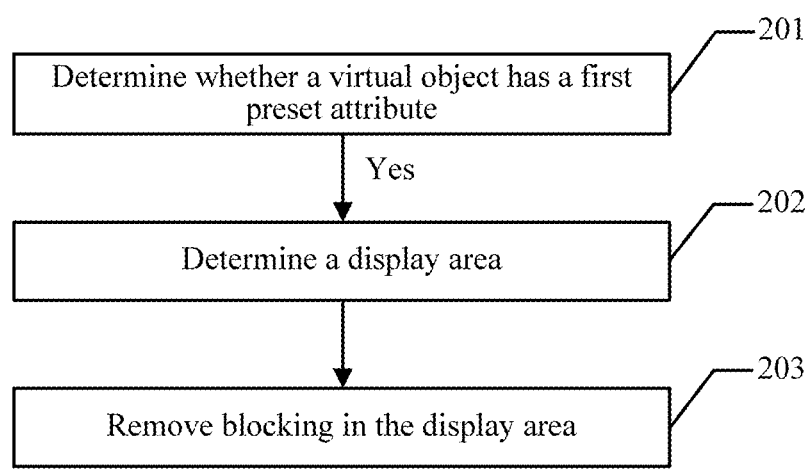
FIG. 4 is a flowchart of an image display method according to an embodiment.

FIG. 4 is a flowchart of an image display method according to an exemplary embodiment. Referring to FIG. 4, a basic procedure of the image display method according to an exemplary embodiment includes the following operations 201-203:

Operation 201. Determine whether the virtual object has a first preset attribute.

In a game having a fog mechanism, areas that have not been explored on a map are indicated as being blocked by fog. The image display method provided in the disclosure is triggered when a player disperses fog.

In this embodiment, a mobile terminal may add the first preset attribute in advance to one or more virtual objects in the game. The first preset attribute is used to indicate that an image is displayed by using the method described in this embodiment. During fog dispersal, the mobile terminal determines whether the virtual object has the first preset attribute. It is determined whether the virtual object has the first preset attribute after an image processing apparatus obtains the information about the current location of the virtual object on the application interface, and queries for the line-of-sight blocking data corresponding to the location information based on the location information.

If it is determined that the virtual object has the first preset attribute, operation 202 is performed.

If it is determined that the virtual object does not have the first preset attribute, operations 202 and 203 are not performed.

Operation 202. Determine a display area.

If the virtual object has the first preset attribute, the mobile terminal determines a coverage area of the virtual object as a display area.

In the disclosure, the coverage area of the virtual object may be a circular area centered on a coordinate location of the virtual object with a radius of a preset length. The preset length is used to indicate a line-of-sight length, defined in the game, of the virtual object.

In the disclosure, the display area may be an area whose landforms are totally displayed to a user without fog blocking.

In an exemplary embodiment, because the virtual object may be a playable character manipulated by the player or a partner of the player, or may be an NPC, and the playable character may have different levels, the mobile terminal may set different line-of-sight lengths for different virtual objects. For example, the mobile terminal may set a longer line-of-sight length for the playable character, and set a shorter line-of-sight length for the NPC. For another example, the mobile terminal may set a longer line-of-sight length for a character at a higher level, and set a shorter line-of-sight length for a character at a lower level. Different line-of-sight lengths are set for different simulated characters, so that different virtual objects can have coverage areas of different sizes.

During actual running of the game, the mobile terminal displays a map in map grids. Specifically, the mobile terminal divides the map into a plurality of map grids, calculates display content of each map grid one by one, and then displays the display content of each map grid to the user.

Figure 5:
FIG. 5 is a schematic diagram of map grids according to an embodiment.

FIG. 5 is a schematic division diagram of map grids according to an embodiment.

Each grid is a map grid, a dark gray area in the upper part of FIG. 5 is a wall obstacle, and a light gray block area in FIG. 5 is a bush obstacle. It can be seen that the map is displayed in map grids.

In an exemplary embodiment, in the disclosure, the mobile terminal may mark a map grid included in the display area with a valid tag, and does not display a fog blocking effect on the map grid with the valid tag during display. In this embodiment, because the coverage area of the virtual object is the display area, the mobile terminal may put the valid tag in the coverage area of the virtual object.

Operation 203. Remove blocking in the display area.

In this embodiment, before the image processing apparatus outputs the first mask layer and the at least two mask layers except the second mask layer in the display unit to the application interface after mixing, blocking in the display area further needs to be removed.

Specifically, the mobile terminal displays the map on a screen, and removes blocking in the display area during display, so that the map in the display area can be displayed on the screen to the player.

Figure 6:
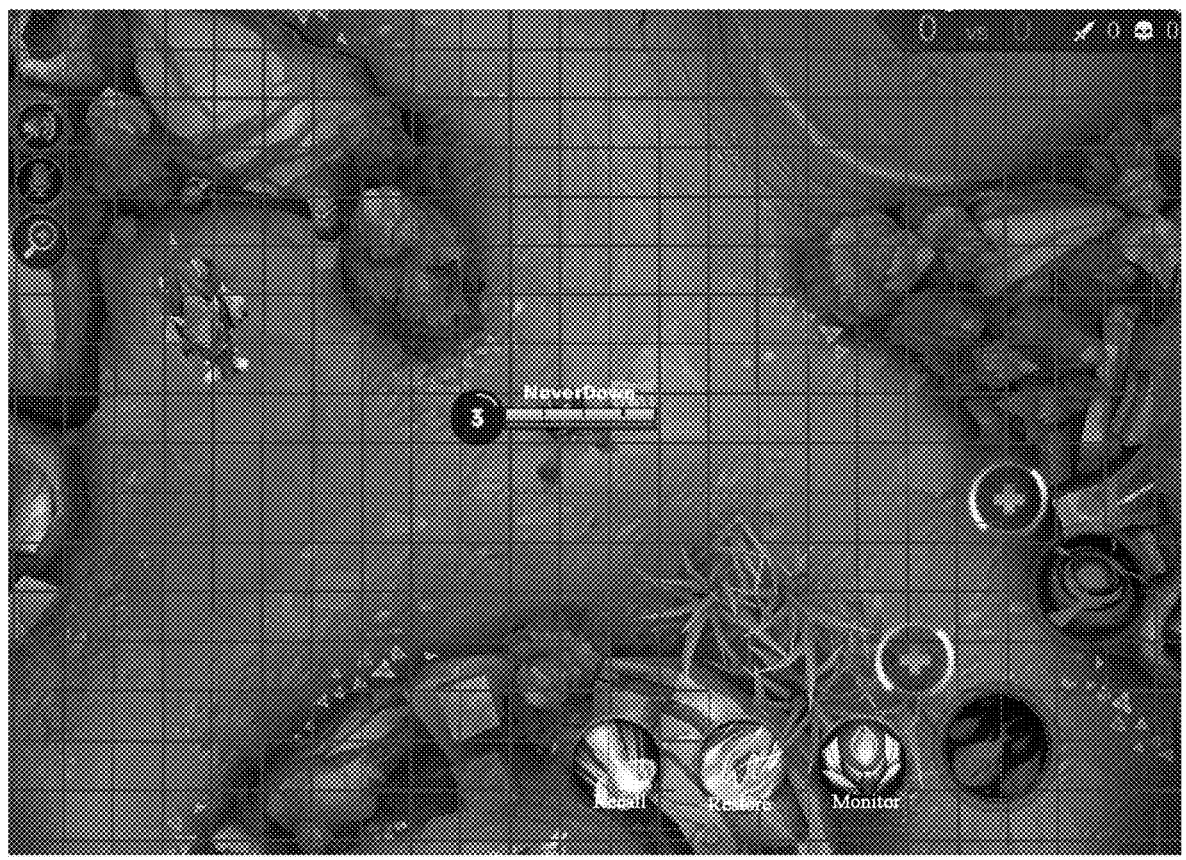
FIG. 6 is a schematic diagram of a game interface according to an embodiment.

FIG. 6 shows an interface of a player during game running according to an embodiment.

It can be seen from FIG. 6 that a virtual object (e.g., a player character) is facing a piece of bush, and as an obstacle, the bush blocks a line of sight of the virtual object, but fog in an area behind the bush has been dispersed.

In an exemplary embodiment, the mobile terminal may recognize whether each map grid is marked with a valid tag, and remove fog blocking on a map grid with a valid tag.

In an exemplary embodiment, the map outside the display area may be still blocked by fog, and the mobile terminal may recognize whether each map grid is marked with a valid tag, and display a fog blocking effect on a map grid without a valid tag.

It should be noted that whether an obstacle is present on the map does not need to be considered in this embodiment. Even if an obstacle is present in the coverage area of the virtual object, fog blocking in an area behind the obstacle may be still removed. Such an algorithm may be understood as that the obstacle no longer blocks the line of sight of the virtual object, the line of sight of the virtual object "penetrates" the obstacle, and extends behind the obstacle, and fog behind the obstacle is dispersed.

In this embodiment, a mobile terminal determines whether a virtual object on a target map has a first preset attribute, determines a coverage area of the virtual object as a display area if determining that the virtual object has the first preset attribute, and removes fog blocking in the display area. In this embodiment, even if an obstacle is present in the coverage area of the virtual object, the virtual object can still disperse fog behind the obstacle. Compared with the related art technology in which an area behind an obstacle is blocked by fog, this embodiment expands a display area of a map, and reduces an area of the map that is blocked by fog. Therefore, overall brightness of a game screen is improved, and visual experience of a player is improved.

2. Map-Based Image Display Method

In an exemplary embodiment, another image display manner may be provided based on the embodiment corresponding to FIG. 2.

Figure 7:
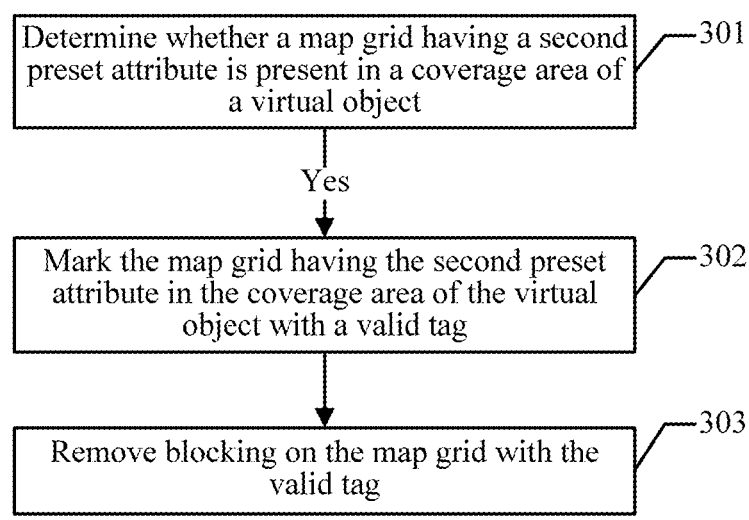
FIG. 7 is a flowchart of an image display method according to an embodiment.

FIG. 7 is a flowchart of an image display method according to an embodiment.

Referring to FIG. 7, a basic procedure of the method includes the following operations 301-303:

Operation 301. Determine whether a map grid having a second preset attribute is present in a coverage area of the virtual object.

A mobile terminal displays a map in map grids. In this embodiment, the mobile terminal may preset the second preset attribute for one or more map grids in the map. The second preset attribute is used to indicate that an image is displayed by using the method described in this embodiment.

In an exemplary embodiment, because this embodiment is mainly used to remove fog blocking on the map grid having the second preset attribute, but during game running, an obstacle usually blocks a line of sight of the virtual object, resulting in that fog in an area behind the obstacle cannot be dispersed, in this embodiment, the map grid having the second preset attribute may be distributed near an obstacle.

During fog dispersal, the mobile terminal determines whether the map grid having the second preset attribute is present in the coverage area of the virtual object.

If it is determined that the map grid having the second preset attribute is present in the coverage area of the virtual object, operation 302 is performed.

If it is determined that the map grid having the second preset attribute is absent from the coverage area of the virtual object, operations 302 and 303 are not performed.

Operation 302. Mark the map grid having the second preset attribute in the coverage area of the virtual object with a valid tag.

In this embodiment, the mobile terminal determines the map grid having the second preset attribute in the coverage area of the virtual object as a display area, and therefore marks the map grid having the second preset attribute in the coverage area of the virtual object with the valid tag.

Operation 303. Remove blocking on the map grid with the valid tag.

The mobile terminal displays the map on a screen, and removes blocking in the display area during display, so that the map in the display area can be displayed on the screen to a player. Because the display area in this embodiment is the map grid having the second preset attribute in the coverage area of the virtual object, the mobile terminal removes fog blocking on the map grid having the second preset attribute in the coverage area of the virtual object.

In a specific implementation process, the mobile terminal may recognize whether each map grid is marked with a valid tag, and remove fog blocking on a map grid with a valid tag.

In an exemplary embodiment, the map outside the display area is still blocked by fog. In a specific implementation process, the mobile terminal may recognize whether each map grid is marked with a valid tag, and display a fog blocking effect on a map grid without a valid tag.

It should be noted that because this embodiment is mainly applied to a fog dispersal scene, and in the fog dispersal scene, the virtual object can disperse only fog in the coverage area of the virtual object at most, in this embodiment, only the map grid having the second preset attribute in the coverage area of the virtual object is marked with the valid tag, and a map grid outside the coverage area of the virtual object is not marked with a valid tag even if the map grid has the second preset attribute.

In this embodiment, a mobile terminal determines whether a map grid having a second preset attribute is present in a coverage area of a virtual object, marks the determined map grid with a valid tag if determining that the map grid having the second preset attribute is present in the coverage area of the virtual object, and then removes fog blocking on the map grid with the valid tag. Compared with the related art technology, a method according to exemplary embodiments adds the second preset attribute to some map grids, so that fog blocking on the map grids is removed when the map grids are in the coverage area of the virtual object. Compared with the related art technology, a method according to an exemplary embodiment expands a display area of a map, and reduces an area of the map that is blocked by fog. Therefore, overall brightness of a game screen is improved, and visual experience of a player is improved.

3. Virtual-Object-Plus-Map-Based Image Display Method

The embodiments shown in FIG. 4 and FIG. 7 respectively describe a virtual-object-based image display method and a map-based image display method. The two image display methods may be implemented separately, and may also be combined for implementation. The following describes a virtual-object-plus-map-based image display method.

Figure 8:
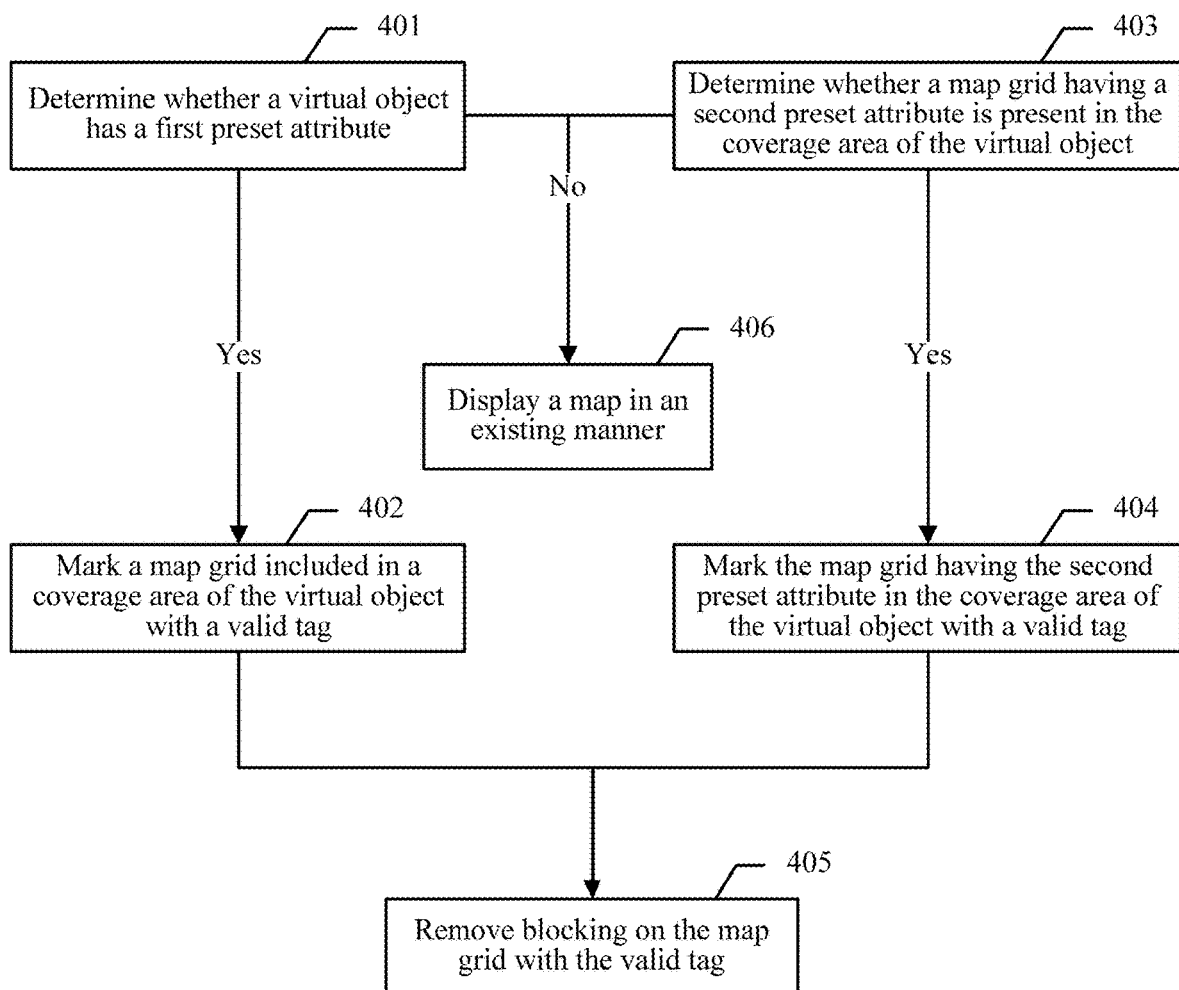
FIG. 8 is a flowchart of an image display method according to an embodiment.

FIG. 8 is a flowchart of an image display method according to an embodiment Referring to FIG. 8, a basic procedure of the image display method according to an embodiment includes the following operations 401-406:

Operation 401. Determine whether the virtual object has a first preset attribute.

During fog dispersal, a mobile terminal determines whether the virtual object has the first preset attribute.

If it is determined that the virtual object has the first preset attribute, operation 402 is performed.

If it is determined that the virtual object does not have the first preset attribute, operation 406 is performed.

Operation 402. Mark a map grid included in a coverage area of the virtual object with a valid tag.

If the mobile terminal determines that the virtual object has the first preset attribute, the mobile terminal marks the map grid included in the coverage area of the virtual object with the valid tag.

Operation 403. Determine whether a map grid having a second preset attribute is present in the coverage area of the virtual object.

During fog dispersal, the mobile terminal determines whether the map grid having the second preset attribute is present in the coverage area of the virtual object.

If it is determined that the map grid having the second preset attribute is present in the coverage area of the virtual object, operation 404 is performed.

If it is determined that the map grid having the second preset attribute is absent from the coverage area of the virtual object, operation 406 is not performed.

Operation 404. Mark the map grid having the second preset attribute in the coverage area of the virtual object with a valid tag.

If the mobile terminal determines that the map grid having the second preset attribute is present in the coverage area of the virtual object, the mobile terminal marks the map grid having the second preset attribute in the coverage area with the valid tag.

Operation 405. Remove blocking on the map grid with the valid tag.

The mobile terminal displays a map on a screen, and during display, the mobile terminal may recognize whether each map grid is marked with a valid tag, and remove fog blocking on a map grid with a valid tag.

Operation 406. Display a map in an existing manner.

If the mobile terminal determines that the virtual object does not have the first preset attribute, and the mobile terminal determines that the map grid having the second preset attribute is absent from the coverage area of the virtual object, the mobile terminal may display the map in the existing manner. Specifically, the mobile terminal determines that a display area includes: an area in which a line of sight of the virtual object is not blocked by an obstacle in the coverage area of the virtual object. Then the mobile terminal displays the display area. In this case, fog in an area within a field-of-view range of the virtual object is dispersed, but an area behind the obstacle is still blocked by fog.

For detailed descriptions of this embodiment, refer to the corresponding descriptions provided with reference to the embodiments shown in FIG. 4 and FIG. 7. Repetitive descriptions would be avoided.

The foregoing describes an image processing method according to exemplary embodiment of the disclosure. The following describes an apparatus that performs the image processing method according to exemplary embodiments.

Figure 9:
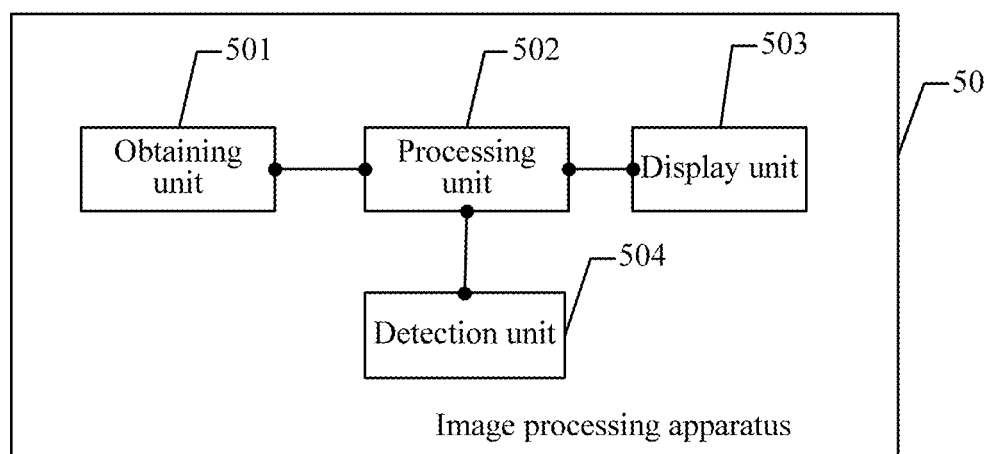
FIG. 9 is a schematic structural diagram of an image processing apparatus according to an embodiment.

FIG. 9 is a schematic structural diagram of an image processing apparatus according to an embodiment.

Referring to FIG. 9, an image processing apparatus 50 includes an obtaining unit 501, a processing unit 502, a display unit 503, and a detection unit 504.

The obtaining unit 501 is configured to obtain information about a current location of a virtual object on the application interface, and query for line-of-sight blocking data corresponding to the location information based on the location information.

The processing unit 502 is configured to generate a first mask layer based on a current operation status of the virtual object on the application interface by using the line-of-sight blocking data obtained by the obtaining unit 501 through query.

The processing unit 502 inputs, according to a preset unit of time, the obtained first mask layer to the display unit 503 including at least two mask layers, to replace a second mask layer in the at least two mask layers that is generated earliest.

The display unit 503 is configured to output the first mask layer and the at least two mask layers except the second mask layer in the display unit 503 to the application interface after mixing.

In this embodiment, when a player manipulates a virtual object, the processing unit 502 can directly obtain corresponding line-of-sight blocking data through query based on current location information of the virtual object, which can reduce processing operations. Then the processing unit generates a first mask layer by using the line-of-sight blocking data, and uploads the first mask layer to the display unit within a unit of time, to replace an earliest mask layer in the display unit. A weight of a grayscale value of a mask layer on an application interface is updated by mixing and outputting remaining mask layers in the display unit 503. In this way, smooth transition of a mask map is achieved on a per frame basis, and operation load caused by high-frequency mask map uploading can be reduced.

In an exemplary embodiment, in some embodiments, if the line-of-sight blocking data corresponding to each area unit on the application interface is calculated based on the static obstacle in the application interface, when a target dynamic obstacle is present in the application interface within a visible range corresponding to the location information, and line-of-sight blocking data of information about a first location of the target dynamic obstacle on the application interface in the presence of the target dynamic obstacle is not stored locally, the processing unit 502 is further configured to:

calculate a current visible range of the first location information based on a line-of-sight detection result of the detection unit 504 and a field-of-view range of the first location information; and store the current visible range of the first location information, to replace a local stored visible range of the first location information, where the current visible range of the first location information is used to determine a current visible range of the virtual object.

In an exemplary embodiment, before the detection unit 401 obtains the information about the current location of the virtual object on the application interface, the processing unit 502 may be further configured to:

obtain second location information of an obstacle by using the obtaining unit 501, where the obstacle includes at least one of a static obstacle and a dynamic obstacle; and perform line-of-sight detection on an area unit around the second location information by using the detection unit 504, and then calculate a visible range of each area unit based on a line-of-sight detection result and a field-of-view range of the second location information, where the visible range of the area unit is used for the virtual object to determine the current visible range of the virtual object based on the current location information of the virtual object, and determine a current visible range of another virtual object based on current location information of the another virtual object.

In an exemplary embodiment, the processing unit 502 may be configured to:

calculate an interpolation between the first mask layer and the at least two mask layers except the second mask layer in the display unit 503, and update a weight of a grayscale value of a mask layer on the application interface by using the interpolation.

In an exemplary embodiment, the processing unit 502 calculates a grayscale value of each pixel on the demarcation edge through pixel convolution when rendering a demarcation edge of the mask layer.

In an exemplary embodiment, mixing remaining mask layers in the display unit 503 may include mixing pixels of demarcation edges of the first mask layer and the at least two mask layers except the second mask layer in the display unit, where the demarcation edge is used to distinguish areas having a grayscale value difference on two sides of the demarcation edge.

In an exemplary embodiment, the demarcation edge of the mask map includes a plurality of first pixels, and the processing unit 502 may be configured to perform the following operations:

operation A: calculating, for a plurality of first pixels on a demarcation edge of a target mask map, a grayscale value of at least one pixel with a distance to each first pixel less than or equal to a (a being a preset value);

operation B: obtaining a corresponding mask map based on the grayscale value of the at least one pixel obtained in operation A, and using the obtained mask map as the target mask map; and using at least one target mask map that is finally obtained as an edge mask map of a mask layer when a number of times operation A and operation B are performed for each first pixel reaches a preset time.

In an exemplary embodiment, after the obtaining unit 501 obtains the information about the current location of the virtual object on the application interface, and queries for the line-of-sight blocking data corresponding to the location information based on the location information, the processing unit 502 is further configured to determine whether the virtual object on a target map has a first preset attribute; and determine a coverage area of the virtual object as a display area if the virtual object has the first preset attribute, where the coverage area includes a circular area centered on the location of the virtual object with a radius of a preset length; and the display unit 503 is further configured to remove blocking in the display area after the first mask layer and the at least two mask layers except the second mask layer are output to the application interface after mixing.

In an exemplary embodiment, it is determined whether a virtual object on a target map has a first preset attribute, a coverage area of the virtual object is determined as a display area if it is determined that the virtual object has the first preset attribute, and fog blocking in the display area is removed. In an exemplary embodiment, even if an obstacle is present in the coverage area of the virtual object, the virtual object can still disperse fog behind the obstacle. Compared with the related art technology in which an area behind an obstacle is blocked by fog, an exemplary embodiment expands a display area of a map, and reduces an area of the map that is blocked by fog. Therefore, overall brightness of a game screen is improved, and visual experience of a player is improved.

In an exemplary embodiment, the target map includes a plurality of map grids, and the processing unit 502 may be configured to mark a map grid included in the coverage area with a valid tag; and the display unit 503 may be configured to remove blocking on the map grid with the valid tag.

In an exemplary embodiment, the processing unit 502 is further configured to determine whether a map grid having a second preset attribute is present in the coverage area; and mark the map grid having the second preset attribute in the coverage area with a valid tag when the map grid having the second preset attribute is present in the coverage area.

In an exemplary embodiment, the display unit 503 is further configured to block a map grid without a valid tag in the target map.

In an exemplary embodiment, the target map further includes an obstacle object, and the processing unit 502 is further configured to:

determine, if the virtual object does not have the first preset attribute and the map grid having the second preset attribute is absent from the coverage area, that the display area includes: an area in which a line of sight of the virtual object is not blocked by the obstacle object in the coverage area.

The foregoing describes the apparatus in exemplary embodiments from the perspective of a unitized functional entity. The following describes the apparatus in exemplary embodiments from the perspective of hardware processing.

Figure 10:
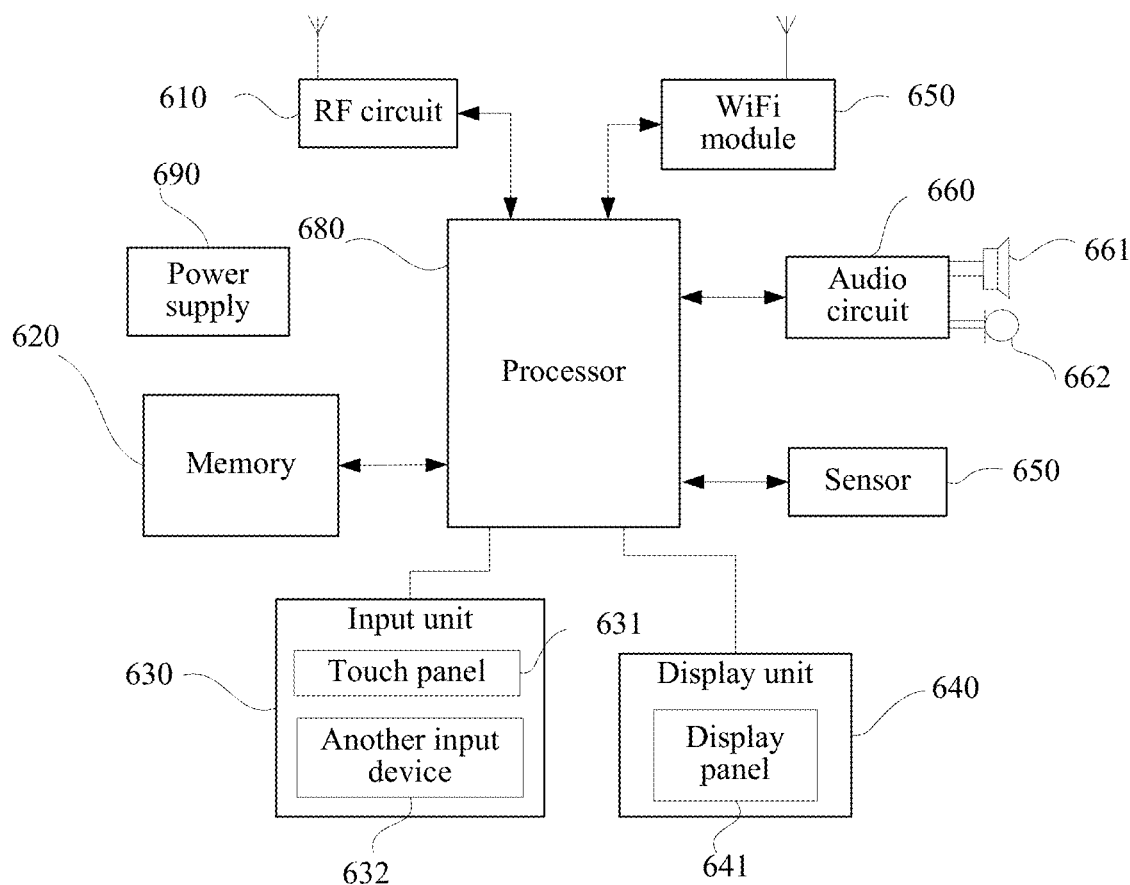
FIG. 10 is a schematic structural diagram of a mobile phone for image processing according to an embodiment.

An embodiment further provides a terminal device. The terminal device may include a terminal device described in an image processing method, as shown in FIG. 10. For ease of description, only parts related to an exemplary embodiment are shown. For specific technical details that are not disclosed, refer to the descriptions provided with reference to the method in the embodiments. In the following, for example, the terminal device may be a mobile phone, but the disclosure is not limited thereto.

FIG. 10 is a block diagram of a partial structure of a mobile phone related to a mobile terminal according to an embodiment.

Referring to FIG. 10, the mobile phone includes: components such as a radio frequency (RF) circuit 610, a memory 620, an input unit 630, a display unit 640, a sensor 650, an audio circuit 660, a wireless fidelity (WiFi) module 670, a processor 680, and a power supply 690. A person skilled in the art may understand that the structure of the mobile phone shown in FIG. 10 does not constitute a limitation to the mobile phone, and the mobile phone may include more or fewer components than those shown in the figure, or some components may be combined, or a different component deployment may be used.

The following specifically describes the components of the mobile phone with reference to FIG. 10:

The RF circuit 610 may be configured to receive and send signals during an information receiving and sending process or a call process. Particularly, the RF circuit 610 receives downlink information from a base station, then delivers the downlink information to the processor 680 for processing, and sends related uplink data to the base station. Generally, the RF circuit 610 includes, but is not limited to, an antenna, at least one amplifier, a transceiver, a coupler, a low noise amplifier (LNA), a duplexer, and the like. In addition, the RF circuit 610 may further communicate with a network and another device by means of wireless communication. The wireless communication may use any communication standard or protocol, including, but not limited to, a Global System for Mobile Communications (GSM), a General Packet Radio Service (GPRS), Code Division Multiple Access (CDMA), Wideband Code Division Multiple Access (WCDMA), Long Term Evolution (LTE), an e-mail, a Short Message Service (SMS), and the like.

The memory 620 may be configured to store a software program and unit. The processor 680 runs the software program and unit stored in the memory 620, to implement various functional applications of the mobile phone and data processing. The memory 620 may mainly include a program storage area and a data storage area. The program storage area may store an operating system, an application program required by at least one function (such as a sound playback function and an image display function), and the like. The data storage area may store data (such as audio data and an address book) created according to use of the mobile. In addition, the memory 620 may include a high speed random access memory, and may also include a non-volatile memory, such as at least one magnetic disk storage device, a flash memory, or another volatile solid-state storage device.

The input unit 630 may be configured to receive input digit or character information, and generate a keyboard signal input related to the user setting and function control of the mobile phone. Specifically, the input unit 630 may include a touch panel 631 and another input device 632. The touch panel 631, which may also be referred to as a touchscreen, may collect a touch operation of a user on or near the touch panel (such as an operation of a user on or near the touch panel 631 by using any suitable object or accessory such as a finger or a stylus), and drive a corresponding connection apparatus according to a preset program.

In an exemplary embodiment, the touch panel 631 may include two parts: a touch detection apparatus and a touch controller. The touch detection device detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 680. Moreover, the touch controller can receive and execute a command sent from the processor 680. In addition, the touch panel 631 may be a resistive, capacitive, infrared, or surface sound wave type touch panel. In addition to the touch panel 631, the input unit 630 may further include the another input device 632. Specifically, the another input device 632 may include, but is not limited to, one or more of a physical keyboard, a functional key (for example, a volume control key or a switch key), a trackball, a mouse, and a joystick.

The display unit 640 may be configured to display information input by the user or information provided for the user, and various menus of the mobile phone. The display unit 640 may include a display panel 641. In an exemplary embodiment, the display panel 641 may be configured by using a liquid crystal display (LCD), an organic light-emitting diode (OLED), or the like. Further, the touch panel 631 may cover the display panel 641. After detecting a touch operation on or near the touch panel 631, the touch panel 631 transfers the touch operation to the processor 680, to determine a type of a touch event. The processor 680 then provides a corresponding visual output on the display panel 641 according to the type of the touch event. Although, in FIG. 10, the touch panel 631 and the display panel 641 are used as two separate parts to implement input and output functions of the mobile phone, in some embodiments, the touch panel 631 and the display panel 641 may be integrated to implement the input and output functions of the mobile phone.

The mobile phone may further include at least one sensor 650 such as an optical sensor, a motion sensor, and other sensors. Specifically, the optical sensor may include an ambient light sensor and a proximity sensor. The ambient light sensor may adjust luminance of the display panel 641 according to brightness of the ambient light. The proximity sensor may switch off the display panel 641 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 660, a speaker 661, and a microphone 662 may provide audio interfaces between the user and the mobile phone. The audio circuit 660 may convert received audio data into an electric signal and transmit the electric signal to the speaker 661. The speaker 661 converts the electric signal into a sound signal for output. On the other hand, the microphone 662 converts a collected sound signal into an electric signal. The audio circuit 660 receives the electric signal and converts the electric signal into audio data, and outputs the audio data to the processor 680 for processing. Then, the processor 580 sends the audio data to, for example, another mobile phone by using the RF circuit 610, or outputs the audio data to the memory 620 for further processing.

WiFi belongs to a short-range wireless transmission technology. Using the WiFi module 670, the mobile phone can help a user receive and send an e-mail, browse a webpage, access streaming media, and the like. The WiFi module provides wireless broadband Internet access for a user. Although FIG. 10 shows the WiFi module 670, it may be understood that the WiFi module is not a necessary component of the mobile phone, and when required, the WiFi module may be omitted as long as the scope of the essence of the disclosure is not changed.

The processor 680 is the control center of the mobile phone, and is connected to various parts of the mobile phone by using various interfaces and lines. By running or executing the software program and/or unit stored in the memory 620, and invoking data stored in the memory 620, the processor 780 performs various functions and data processing of the mobile phone, thereby performing overall monitoring on the mobile phone. In an exemplary embodiment, the processor 680 may include one or more processing units. The processor 680 may be integrated with an application processor and a modem processor. The application processor mainly processes an operating system, a user interface, an application program, and the like. The modem processor mainly processes wireless communication. It may be understood that the foregoing modem may alternatively not be integrated into the processor 680.

The mobile phone further includes the power supply 690 (such as a battery) for supplying power to the components. The power supply may be logically connected to the processor 680 by using a power management system, thereby implementing functions such as charging, discharging and power consumption management by using the power management system.

Although not shown in the figure, the mobile phone may further include a camera, a Bluetooth unit, and the like, which are not further described herein.

In an exemplary embodiment, the processor 680 included in the mobile phone further controls execution of a method procedure performed by the image processing apparatus in the image processing method.

In the foregoing embodiments, the description of each embodiment has respective focuses. For a part that is not described in detail in an embodiment, reference may be made to related descriptions in other embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the disclosure essentially, or the part contributing to the related art technology, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments. The foregoing storage medium includes: any medium that can store program code, such as a USB flash drive, a removable hard disk, a read-only memory (ROM), a random access memory (RAM), a magnetic disk, or an optical disc.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The "unit" or "module" used herein may be a hardware component such as a processor or a circuit, and/or a software component that is executed by a hardware component such as a processor.

The technical solutions provided in the embodiments are detailed above. Although the principles and implementations of the disclosure are described through specific examples in this specification, the descriptions of the embodiments are only intended to help understand the method and core ideas of the disclosure. A person of ordinary skill in the art may make modifications to the specific implementations and application according to the disclosure. To conclude, the content of the specification should not be construed as a limitation to the disclosure. Any modification, equivalent replacement, improvement, or the like made within the spirit and scope of the exemplary embodiments shall fall within the protection scope of the exemplary embodiments.

What is claimed is:

1. An image processing method, which is performed by an imaging processing apparatus comprising at least one processor, comprising:
   obtaining, by the at least one processor, line-of-sight blocking data corresponding to an area unit in which a virtual object is currently located in an application interface, the application interface comprising a plurality of area units and at least two mask layers; and
   converting the obtained line-of-sight blocking data into a first mask layer and outputting to the application interface, according to a preset unit of time, the first mask layer with the at least two mask layers except for a second mask layer that is generated earliest among the at least two mask layers.

2. The method according to claim 1, wherein the application interface comprises at least one of a static obstacle and a dynamic obstacle,
   the method further comprising:
   calculating line-of-sight blocking data corresponding to each area unit on the application interface based on at least one of the static obstacle and the dynamic obstacle in the application interface, and
   locally storing the line-of-sight blocking data corresponding to each area unit on the application interface.

3. The method according to claim 2, wherein the line-of-sight blocking data corresponding to each area unit on the application interface is calculated based on the static obstacle in the application interface,
   the method further comprising, when a target dynamic obstacle is present in the application interface within a visible range corresponding to a current location of the virtual object, and line-of-sight blocking data corresponding to a first location of the target dynamic obstacle on the application interface is not locally stored:
   calculating a current visible range of the first location through line-of-sight detection based on a field-of-view range of the first location; and
   storing the current visible range of the first location, to replace a locally stored visible range of the first location, wherein the current visible range of the first location is used to determine a current visible range of the virtual object.

4. The method according to claim 2, further comprising:
   obtaining location information of an obstacle, wherein the obstacle comprises at least one of the static obstacle and the dynamic obstacle; and
   calculating a visible range of each area unit through line-of-sight detection based on a field-of-view range of the location information of the obstacle, wherein the visible range of each area unit is used to determine a current visible range of the virtual object based on a current location of the virtual object, and determine a current visible range of another virtual object based on a current location of the another virtual object.

5. The method according to claim 4, further comprising mixing the first mask layer and the at least two mask layers, except the second mask layer by calculating an interpolation between the first mask layer and the at least two mask layers, except the second mask layer, and updating a weight of a grayscale value of a mask layer on the application interface by using the interpolation.

6. The method according to claim 5, further comprising:
   calculating a grayscale value of each pixel on a demarcation edge of one of the first mask layer and the at least two mask layers, except the second mask layer, through pixel convolution to render the demarcation edge.

7. The method according to claim 6, wherein the mixing the first mask layer and the at least two mask layers, except the second mask layer, comprises mixing pixels of demarcation edges of the first mask layer and the at least two mask layers, except the second mask layer.

8. The method according to claim 7, wherein a demarcation edge of a target mask map comprises a plurality of first pixels, and the calculating the grayscale value of each pixel on the demarcation edge through the pixel convolution comprises:
   operation A: calculating, for the plurality of first pixels on the demarcation edge of the target mask map, a grayscale value of at least one pixel having a distance to each first pixel less than or equal to a preset value;
   operation B: obtaining a mask map based on the grayscale value of the at least one pixel obtained in operation A, and using the obtained mask map as the target mask map; and
   using at least one target mask map that is finally obtained as an edge mask map of the mask layer when a number of times operation A and operation B are performed for each first pixel reaches a preset time.

9. The method according to claim 1, further comprising, after the obtaining and the querying:
   determining whether the virtual object on a target map has a first preset attribute, wherein the target map comprises a blocked area, of which a view is blocked when displaying the target map; and
   determining a coverage area of the virtual object as a display area in response to the virtual object having the first preset attribute, wherein the coverage area comprises a circular area centered on a location of the virtual object, the circular area having a radius of a preset length; and
   removing blocking of the view in the display area, before the outputting of a result of the mixing.

10. The method according to claim 9, wherein the target map comprises a plurality of map grids, and the determining the coverage area comprises:
    marking a map grid included in the coverage area and having a valid tag; and
    the removing the blocking of the view in the display area comprises:
    removing blocking of the view on the map grid having the valid tag.

11. The method according to claim 10, further comprising, before the removing the blocking of the view in the display area:
    determining whether a map grid having a second preset attribute is present in the coverage area; and
    marking the map grid having the second preset attribute in the coverage area and having the valid tag in response to the map grid having the second preset attribute being present in the coverage area.

12. The method according to claim 11, further comprising:
    blocking a map grid not having the valid tag in the target map.

13. The method according to claim 11, further comprising:
    determining, in response to the virtual object not having the first preset attribute and the map grid having the second preset attribute being absent from the coverage area, that the display area comprises an area in which a line of sight of the virtual object is not blocked by an obstacle object in the coverage area.

14. An image processing apparatus, comprising:
at least one memory operable to store program code; and
at least one processor operable to read the program code and operate as instructed by the program code, the program code comprising:
  obtaining code configured to cause at least one of the at least one processor to obtain line-of-sight blocking data corresponding to an area unit in which a virtual object is currently located in an application interface, the application interface comprising a plurality of area units and at least two mask layers;
  converting code configured to cause at least one of the at least one processor to convert the obtained line-of-sight blocking data into a first mask layer and outputting to the application interface, according to a preset unit of time, the first mask layer with the at least two mask layers except for a second mask layer that is generated earliest among the at least two mask layers.

15. The image processing apparatus according to claim 14, wherein the application interface comprises at least one of a static obstacle and a dynamic obstacle,
the program code further comprising:
  calculating code configured to cause the at least one processor to calculate line-of-sight blocking data corresponding to each area unit on the application interface based on at least one of the static obstacle and the dynamic obstacle in the application interface, and
  storing code configured to cause the at least one processor to locally store the line-of-sight blocking data corresponding to each area unit on the application interface.

16. The image processing apparatus according to claim 15, wherein the line-of-sight blocking data corresponding to each area unit on the application interface is calculated based on the static obstacle in the application interface,
  when a target dynamic obstacle is present in the application interface within a visible range corresponding to a current location of the virtual object, and line-of-sight blocking data corresponding to a first location of the target dynamic obstacle on the application interface is not locally stored, the program code further comprising code configured to cause the at least one processor to perform:
  calculating a current visible range of the first location through line-of-sight detection based on a field-of-view range of the first location; and
  storing the current visible range of the first location, to replace a locally stored visible range of the first location, wherein the current visible range of the first location is used to determine a current visible range of the virtual object.

17. The image processing apparatus according to claim 15, wherein the program code further comprises:
  code configured to cause the at least one processor to obtain location information of an obstacle, wherein the obstacle comprises at least one of the static obstacle and the dynamic obstacle; and
  code configured to cause the at least one processor to calculate a visible range of each area unit through line-of-sight detection based on a field-of-view range of the location information of the obstacle, wherein the visible range of each area unit is used to determine a current visible range of the virtual object based on a current location of the virtual object, and determine a current visible range of another virtual object based on a current location of the another virtual object.

18. The image processing apparatus according to claim 17, wherein the program code further comprises:
  code configured to cause the at least one processor to calculate an interpolation between the first mask layer and the at least two mask layers except the second mask layer, and updating a weight of a grayscale value of a mask layer on the application interface by using the interpolation.

19. The image processing apparatus according to claim 18, wherein the program code further comprises:
  code configured to cause the at least one processor to calculate a grayscale value of each pixel on a demarcation edge of one of the first mask layer and the at least two mask layers, except the second mask layer, through pixel convolution to render the demarcation edge.

20. A non-transitory computer readable storage medium, comprising instructions causing, when executed by a computer, the computer to perform:
  obtaining line-of-sight blocking data corresponding to an area unit in which a virtual object is currently located in an application interface, the application interface comprising a plurality of area units and at least two mask layers; and
  converting the obtained line-of-sight blocking data into a first mask layer and outputting to the application interface, according to a preset unit of time, the first mask layer with the at least two mask layers except for a mask layer that is generated earliest among the at least two mask layers.

* * * * *